Figure 1:
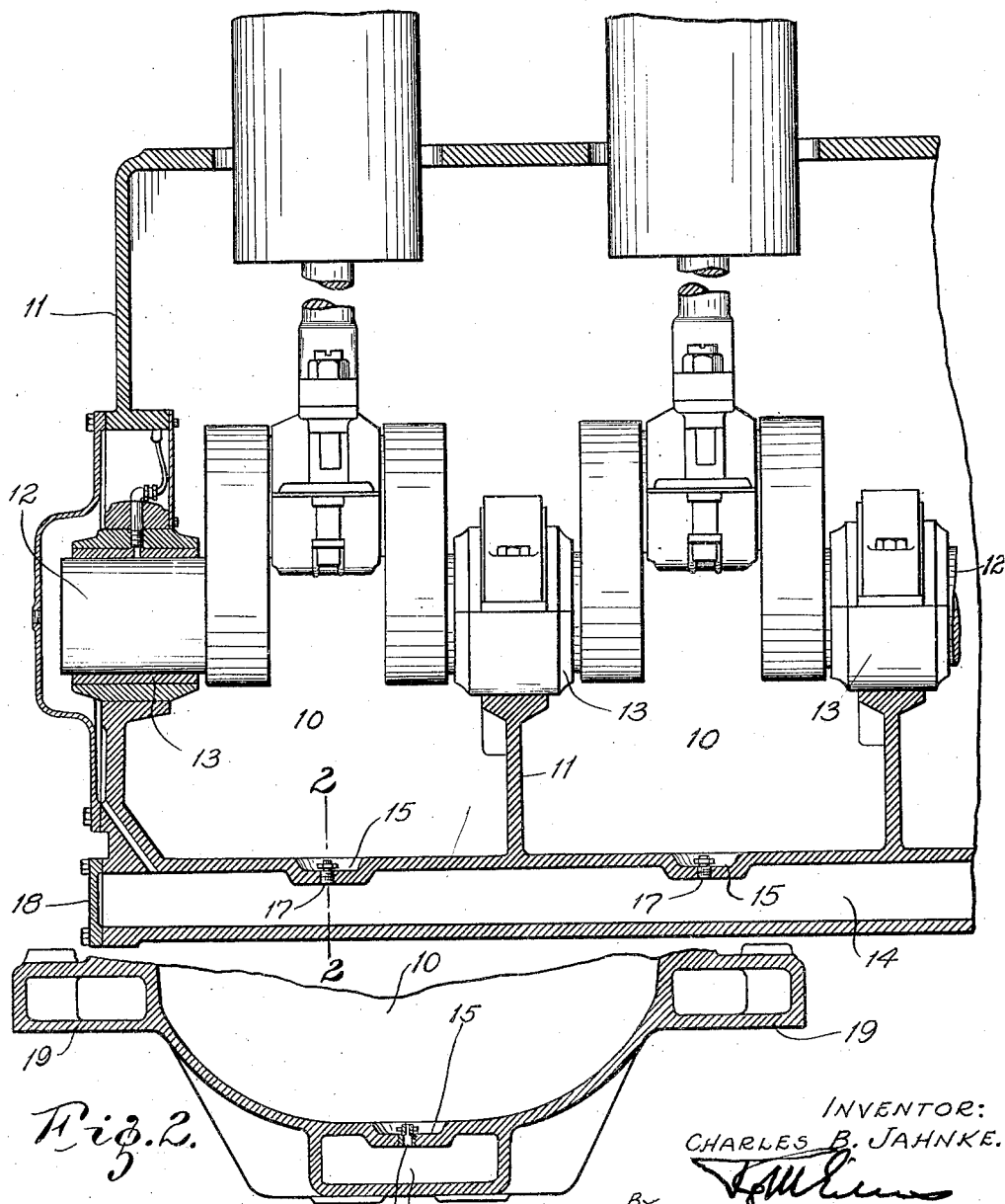

Sept. 13, 1932.  C. B. JAHNKE  1,876,948

LUBRICANT CONDUCTING MEANS

Filed April 1, 1927

INVENTOR:
CHARLES B. JAHNKE.
BY
ATTORNEYS

Patented Sept. 13, 1932

1,876,948

UNITED STATES PATENT OFFICE

CHARLES B. JAHNKE, OF BELOIT, WISCONSIN, ASSIGNOR TO FAIRBANKS, MORSE & CO., OF CHICAGO, ILLINOIS, A CORPORATION OF ILLINOIS

LUBRICANT CONDUCTING MEANS

Application filed April 1, 1927. Serial No. 180,253.

This invention relates to improvements in lubricant conducting means and especially to an improved arrangement of oil passages adapted for draining the oil from the crank cases of internal combustion engines.

An object of this invention is the provision of a simplified, more economical means for conveying excess oil from the crank cases of engines lubricated by other than a splash system.

A further object is the provision of a continuous oil drain passage for engine crank cases, which may be formed integrally with such crank cases to eliminate auxiliary piping, conduits and pipe fittings, and the labor incident to installing and maintaining prevailing oil drain systems.

A further object is the provision of an oil drain which is simple and more rugged than existing devices for this purpose, and which will minimize the necessity for replacement and will overcome the usual effects of leakage and corrosion.

A further object is the provision of an oil drain, cast integrally with the crank case, which is especially applicable to marine or other engines having the engine supports above the level of the oil drain, in which case exposed piping would not be protected by the engine base in handling, before and during installation.

Further objects and advantages will appear from the drawing and the following detailed description.

Although my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

Figure 2:
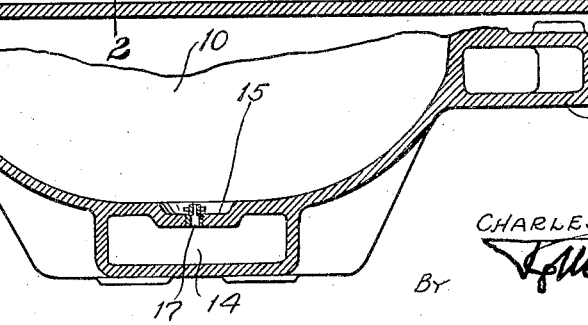

Referring to the drawing, Fig. 1 is a side elevation, partially in section, of the crank case and upper base of an engine to which an approved form of my invention has been applied. Fig. 2 is a fragmentary vertical section taken along line 2—2 in Fig. 1.

Referring by numerals to the drawing, the engine crank chambers, which may be of more or less conventional construction, are indicated at 10. The chambers are enclosed by walls 11 of the crank case, which is adapted to house the crank shaft 12. The crank shaft is in turn carried by bearings 13. At 14 I have indicated a preferred form of oil drain passage. By preference the passage 14 is located at or near the lowest portion of the crank chambers 10, so that the oil will tend to flow by gravity to the drain passage. The cast-in drain passage 14 is preferably made of a size considerably larger than the diameter of oil pipes customarily employed for draining the crank case. The passage 14 may be rectangular in cross section, as shown, or cast in any other practical form to serve the purpose of an oil drain and yet permit ease of cleaning. Depending somewhat upon the mode of installation of the particular engine, the drain passage 14 may be made deeper at one end of the engine than at the other so as to provide a fall toward an oil collecting sump or pump, (not shown). The bottom of each of the crank cases is preferably provided with a recess 15. This may consist of any form of depression, preferably near the center and at the lowest part of each crank case. A suitable strainer (not shown) may be located over the recess 15. Between the recess 15 and the oil drain passage 14 I prefer in certain cases to provide an orifice 17. The orifice 17 is advisable where this arrangement is employed to drain the oil from the crank case in engines employing crank case compression, and serves to provide a restricted communication between recess 15 and passage 14, for the purpose of minimizing the loss of compression due to escape of air or gas through this connecting opening. The cast-in oil passage 14 is preferably provided at its ends with covers or plates 18. The provision of the end plates permits access to the drain passage for cleaning, whenever necessary. In lieu of the end covers or plates 18 a drain plug of suitable size and form may be used, or some other suitable closure means provided.

At 19 (in Fig. 2) I have indicated the engine supports adapted to receive suitable bolts or anchoring means to secure the engine to the bed timbers. The particular arrangement shown is used for marine engines where the head room above the engine is limited and a sub-base ordinarily eliminated. One result of mounting an engine in this fashion is a lack of protection to exposed oil piping on the crank case. By providing a cast-in oil drain, which preferably has a broad, flat bottom surface, any damage thereto before and during installation, is prevented.

It will be seen that the generous size and the straight line arrangement of the oil passage results in a construction which is little liable to become stopped up for any reason, and which may be easily periodically cleaned from either or both ends of the engine. Located as it is, and being of straight construction and substantial size, such a passage presents no foundry difficulties in casting. Engines can be equipped with a drain passage of this type at a cost comparable with that of copper tubing, fittings and necessary assembly labor.

It will be seen that I have provided an oil conducting conduit which eliminates possibilities of leakage, corrosion and replacement.

I have shown and described a construction in which this invention is applied to a marine engine of the two-cycle type employing crank case compression. For such an engine this construction is particularly valuable, but it is, of course, equally suitable for stationary engines and for engines operating on any other cycle. A shorter section of the cast-in conduit 14 may be employed on a single cylinder engine. Where used on a multi-cylinder engin having the cylinders in line, it is preferred to extend the conduit lengthwise of the engine, substantially the full length thereof.

The operation of the arrangement described is obvious from the foregoing description of parts, but may be briefly discussed for sake of completeness. It is the prevailing practice to lubricate engines of two-cycle, crank case compression type by force feed, rather than to employ a body of oil in the crank case for splash purposes. So that the volume of air compressed in the case will be substantially uniform, and in order that no oil will be carried into the power cylinders it is desirable to prevent the accumulation of any appreciable amount of oil, and to maintain what may be referred to as a "dry" crank case. Of course a certain small amount of oil regularly escapes from the bearings, but in the present construction cannot rise to a level above the orifices 17, since the compression in the case serves immediately to expel the oil therethrough to the passage 14. The latter passage is obviously of considerably greater capacity than the combined capacity of the orifices 17, hence it is impossible for the oil to be returned to the crank cases through the orifices. The restricted capacity of the orifices further serves to prevent any appreciable loss of air or gas from the crank case into the passage 14.

It will thus clearly appear that, at each downward stroke of the piston, any small amount of oil which may have accumulated to a point above the fitting constituting the orifice 17, will be immediately expelled into the drain passage, so that the case is kept normally and practically dry at all times.

What I claim is:

1. In an engine, a crank case, adapted for a substantial pressure, means for keeping a normally dry crank case, including an oil conduit cast integrally therewith near a lower portion thereof, and adapted to serve as an oil drain from said crank case, means forming a crank case outlet to said conduit, in substantially the lower part of the crank case, and including removable oil conducting elements for continuous communication from the case to the conduit, and tending to confine the crank case pressure from said conduit.

2. In a multi-cylinder, two cycle internal combustion engine having crank case compartments adapted for scavenging air pressure and normally to be kept free of oil, means for removing substantially all accumulating oil from said case, said means including an oil drain passage cast integrally with the crank case, substantially at the bottom thereof, and means maintaining an open channel for continuous communication for each of the crank case compartments to the drain passage, through a restricted orifice, each of said channels having its inlet end disposed substantially at the lowermost portion of the crank compartment drained thereby.

3. In a two cycle multi-cylinder internal combustion engine having a crank case compression, a plurality of crank case compartments adapted normally to be kept free of oil, means for continuously removing substantially all of the oil from said compartments, and including an oil drain conduit cast integrally with the crank case substantially at the bottom thereof, means forming a drain outlet from substantially the lowest portion of each of said crank compartments, and maintaining said drain conduit in continuous communication with each of said crank case compartments, and a removable closure member at one end of the oil drain conduit, said compartment-drain outlets each being restricted to an extent to prevent substantial loss of compression therethrough.

CHARLES B. JAHNKE.